US011688190B2

(12) United States Patent
Zhang et al.

(10) Patent No.: US 11,688,190 B2
(45) Date of Patent: Jun. 27, 2023

(54) TEXT REFINEMENT NETWORK

(71) Applicant: ADOBE INC., San Jose, CA (US)

(72) Inventors: Zhifei Zhang, San Jose, CA (US);
Xingqian Xu, Pittsburgh, PA (US);
Zhaowen Wang, San Jose, CA (US);
Brian Price, Pleasant Grove, UT (US)

(73) Assignee: ADOBE INC., San Jose, CA (US)

( * ) Notice: Subject to any disclaimer, the term of this patent is extended or adjusted under 35 U.S.C. 154(b) by 236 days.

(21) Appl. No.: 17/089,865

(22) Filed: Nov. 5, 2020

(65) Prior Publication Data

US 2022/0138483 A1    May 5, 2022

(51) Int. Cl.
*G06V 30/148* (2022.01)
*G06T 7/194* (2017.01)
*G06N 20/00* (2019.01)
*G06N 3/04* (2023.01)
*G06T 11/60* (2006.01)
*G06F 18/214* (2023.01)
*G06V 30/10* (2022.01)

(52) U.S. Cl.
CPC .......... *G06V 30/153* (2022.01); *G06F 18/214* (2023.01); *G06N 3/04* (2013.01); *G06N 20/00* (2019.01); *G06T 7/194* (2017.01); *G06T 11/60* (2013.01); *G06V 30/10* (2022.01)

(58) Field of Classification Search
CPC ....... G06V 30/153; G06T 7/194; G06T 11/60; G06N 20/00; G06N 3/04; G06K 9/6256
See application file for complete search history.

(56) References Cited

U.S. PATENT DOCUMENTS

| | | | |
|---|---|---|---|
| 2007/0286499 A1* | 12/2007 | Freiburg | G06V 20/62 382/229 |
| 2011/0012914 A1* | 1/2011 | Nakamura | G06T 15/04 345/582 |
| 2018/0157927 A1* | 6/2018 | He | G06K 9/00536 |
| 2022/0012919 A1* | 1/2022 | Zhao | G06T 9/002 |
| 2022/0101494 A1* | 3/2022 | Mardani Korani | G06V 10/764 |
| 2022/0138483 A1* | 5/2022 | Zhang | G06N 3/0454 382/176 |
| 2022/0301295 A1* | 9/2022 | Livet | G06V 10/764 |
| 2022/0351716 A1* | 11/2022 | Kim | G06N 3/08 |

OTHER PUBLICATIONS

1Chen, et al., "Encoder-Decoder with Atrous Separable Convolution for Semantic Image Segmentation", In: European Conference on Computer Vision (2018), 18 pages.

(Continued)

*Primary Examiner* — Edward Park
(74) *Attorney, Agent, or Firm* — F. Chau & Associates, LLC

(57) ABSTRACT

Systems and methods for text segmentation are described. Embodiments of the inventive concept are configured to receive an image including a foreground text portion and a background portion, classify each pixel of the image as foreground text or background using a neural network that refines a segmentation prediction using a key vector representing features of the foreground text portion, wherein the key vector is based on the segmentation prediction, and identify the foreground text portion based on the classification.

19 Claims, 12 Drawing Sheets

(56) References Cited

OTHER PUBLICATIONS

2Wang, et al., "Non-local Neural Networks", In: IEEE Conference on Computer Vision and Pattern Recognition. pp. 7794-7803 (2018).
3Fu, et al., "Dual Attention Network for Scene Segmentation", In: IEEE Conference on Computer Vision and Pattern Recognition, pp. 3146-3154 (2019).
4Wang, et al., "Deep High-Resolution Representation Learning for Visual Recognition", IEEE Transactions on Pattern Recognition and Machine Intelligence (2020), pp. 1-23.
5Goyal, et al., "Accurate, Large Minibatch SGD: Training ImageNet in 1 hour", arXiv preprint arXiv:1706.02677 (2017), pp. 1-12.

\* cited by examiner

TEXT REFINEMENT NETWORK

BACKGROUND

The following relates generally to computer vision, and more specifically to segmenting text patterns using machine learning.

Computer vision refers to techniques acquiring, processing, analyzing and understanding digital images. For example, digital images may be input to artificial systems that can extract information. Computer vision includes tasks such as image processing, image segmentation, and object detection.

Segmentation is the process of partitioning a digital image into multiple segments or image objects. In some cases, a segment or an object is represented by a set of pixels and a corresponding class label (i.e., a semantic description of the class the pixels belong to). As such, the output of an image segmentation network may be in the form of an image mask corresponding to one or more classes. Image segmentation helps simplify and change the representation of the digital image into a processed image that users can further analyze and modify. Image segmentation has applications in areas such as image search and retrieval, image synthesis, image editing, and human-computer interactions.

A variety of tools may be used to perform image segmentation. However, conventional segmentation tools are not aware of the unique visual properties of text. Therefore, these tools are prone to make mistakes when identifying text. For example, curves and decorations around the text may be mistakenly segmented as text, or only a portion of the text may be correctly identified and the other portions with similar color and texture may be missing. Therefore, there is a need in the art for an improved image segmentation tool that can accurately classify and parse foreground text information in an image.

SUMMARY

The present disclosure describes systems and methods for performing text segmentation. Embodiments of the disclosure perform an initial segmentation, and then refine the segmentation by identifying features common to portions of the image identified as text. In some examples, a key vector representing the common features is combined with image features using an attention component. According to certain embodiments, a machine learning model is trained using multiple training tasks based on the initial segmentation and the refined segmentation.

A method, apparatus, and non-transitory computer readable medium for text segmentation are described. Embodiments of the method, apparatus, and non-transitory computer readable medium are configured to receive an image including a foreground text portion and a background portion, classify each pixel of the image as foreground text or background using a neural network that refines a segmentation prediction using a key vector representing features of the foreground text portion, wherein the key vector is based on the segmentation prediction, and identify the foreground text portion based on the classification.

A method, apparatus, and non-transitory computer readable medium for training a neural network for text segmentation are described. Embodiments of the method, apparatus, and non-transitory computer readable medium are configured to identify a training set comprising training images and ground truth segmentation information for each of the training images, wherein the ground truth segmentation information identifies a foreground text portion and a background portion, classify each pixel of the training images as foreground text or background to produce a segmentation prediction for each of the training images, compute a first loss function based on a comparison of the segmentation prediction and the ground truth segmentation information, identify a key vector representing features of the foreground text portion based on the segmentation prediction, classify each pixel of the training images as foreground text or background based on the key vector to produce a refined segmentation prediction for each of the training images, compute a second loss function based on a comparison of the refined segmentation prediction and the ground truth segmentation information, and update parameters of the neural network based on the first loss function and the second loss function.

An apparatus and method for text segmentation are described. Embodiments of the apparatus and method include an encoder configured to encode an image to produce a feature map, wherein the image includes a foreground text portion and a background portion, a first decoder configured to decode the feature map to produce a segmentation prediction, a key generator configured to identify a key vector representing features of the foreground text portion based on the segmentation prediction, an attention component configured to produce a combined feature map based on key vector, and a second decoder configured to produce a refined segmentation prediction based on the combined feature map.

DETAILED DESCRIPTION

Figure 1:
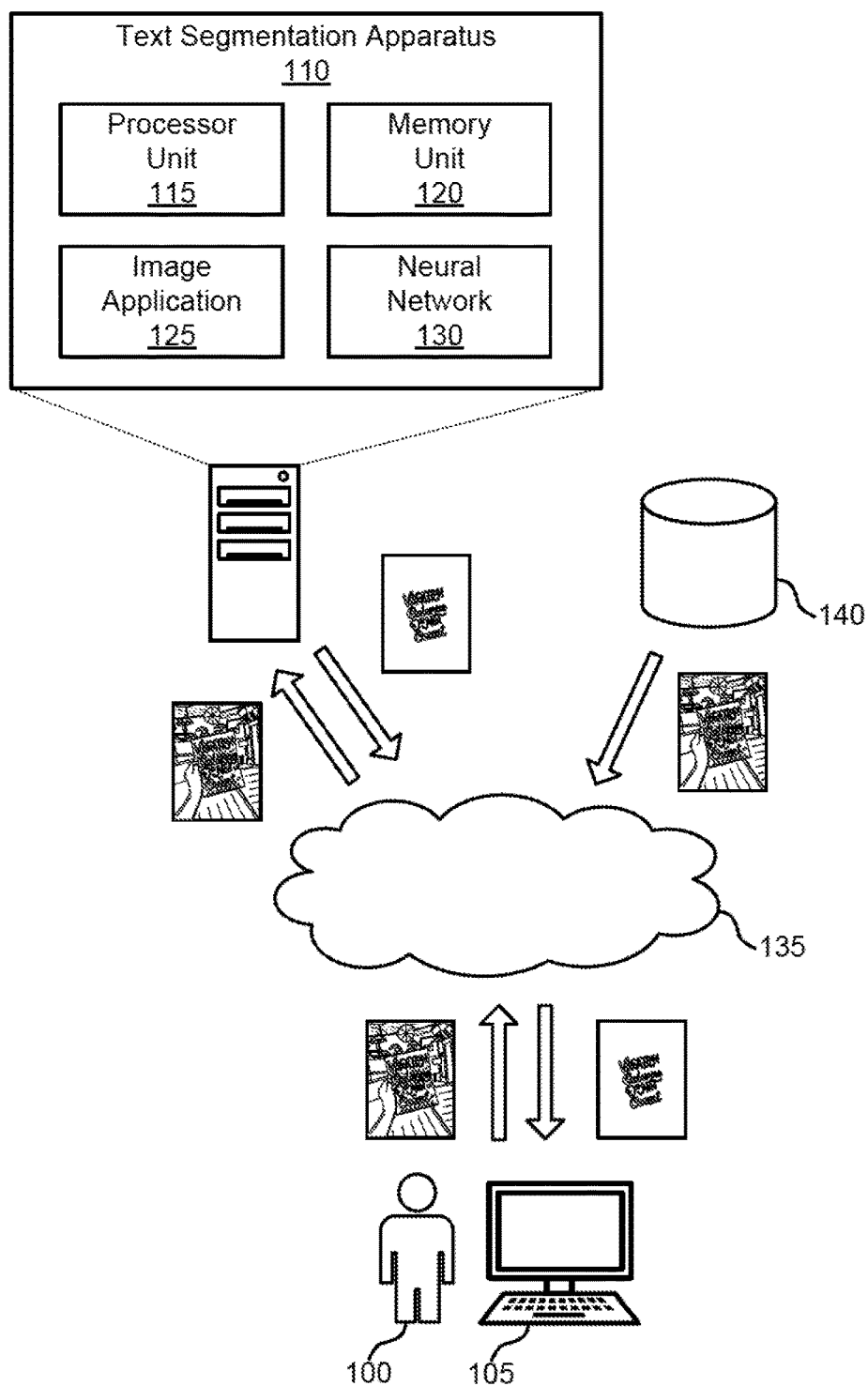
FIG. 1 shows an example of a system for text segmentation according to aspects of the present disclosure.

The present disclosure describes systems and methods for performing text segmentation. Embodiments of the disclosure perform an initial segmentation, and then refine the segmentation by identifying features (e.g., textures) common to portions of the image provisionally identified as text. In some examples, a key vector representing the text features is combined with the encoded image (i.e., features of the entire image) using an attention component. According to certain embodiments, a machine learning model is trained using multiple training tasks based on the initial segmentation and the refined segmentation.

Image segmentation is an important component of computer vision. Text segmentation is the subset of image segmentation that focuses on recognizing text, which has a number of important applications. For example, optical character recognition (OCR) tools localize text portions before recognizing text content.

Some image segmentation tools generate bounding boxes identifying a region that includes the text. However, for text-related downstream applications such as style transfer, text removal, and image editing, knowing the rough location of text (i.e., using bounding boxes) may not be sufficient. Such applications depend on more complex subsequent steps for image processing. Therefore, there is a need for text segmentation tools that segment an image at the pixel-level.

Furthermore, conventional segmentation models are not designed specifically for text segmentation, and are therefore unaware of the unique visual properties of text. That is, text has unique visual properties that are different from other objects (e.g., faces, body parts, buildings or natural objects). For example, text may have a weaker spatial connection compared to regular objects. In addition, the semantic information related to text foreground textures may differ from image to image. Thus, the similarity of text features between different images may be smaller than for other objects, while the similarity of text features within one image may be larger than for other objects.

As a result, conventional image segmentation tools are prone to make errors when classifying or segmenting text. For example, curves and decorations around the text may be mistakenly segmented as text, or only a portion of the text may be properly identified and the other portions with similar color and texture may be missing.

Embodiments of the present disclosure include an improved text segmentation tool that addresses the technical problems with conventional networks. For example, a text segmentation tool of the present disclosure employs the unconventional steps of identifying key features associated with a text portion of an image, and then using these features to produce a refined text segmentation. By identifying features common to text portions of the image, an improved text segmentation tool can provide more accurate results at the pixel level. For example, portions of text that would be missed by conventional segmentation tools are correctly classified as text, and non-text portions of an image are not text are not classified as text.

Embodiments of the present disclosure include a neural network having a deep learning backbone network for text segmentation, and a network extension that uses the output from the backbone network and refines its output using a customized query-key attention mechanism to increase accuracy of classification. Embodiments of the present disclosure process text patterns in regular font and artistic designs that are embedded in the image (i.e., instead of exclusively processing regular objects in a daily scene). The text patterns may be of various types and textures depending on the application and user.

In some embodiments, the neural network includes an interchangeable encoder network and a customized query-key attention mechanism that compares foreground text information across an image. A neural network of the present disclosure overcomes challenges recognizing text images. For example, some text regions have no strong spatial prior knowledge and their textures have relatively little semantic meaning. In some embodiments, the neural network includes the unconventional techniques of integrating channel-wise cosine-similarity re-thresholding, foreground feature pooling and query-key attention. As a result, the improved neural network increases accuracy in text segmentation.

System Overview

FIG. 1 shows an example of a system for text segmentation according to aspects of the present disclosure. The example shown includes user 100, user device 105, text segmentation apparatus 110, cloud 135, and database 140. In one embodiment, text segmentation apparatus 110 includes processor unit 115, memory unit 120, image application 125, and neural network 130. However, in some embodiments, the components and functions of the text segmentation apparatus 110 are located on the user device 105.

A user 100 may select an image including foreground text, and the text segmentation apparatus 110 may identify the foreground text (e.g., using a machine learning model). The user 100 may then edit or otherwise use the text identified by the text segmentation apparatus 110.

The user 100 may communicate with the text segmentation apparatus 110 via the user device 105 and the cloud 135. The user device 105 may be a personal computer, laptop computer, mainframe computer, palmtop computer, personal assistant, mobile device, or any other suitable processing apparatus.

A processor unit 115 is an intelligent hardware device, (e.g., a general-purpose processing component, a digital signal processor (DSP), a central processing unit (CPU), a graphics processing unit (GPU), a microcontroller, an application specific integrated circuit (ASIC), a field programmable gate array (FPGA), a programmable logic device, a discrete gate or transistor logic component, a discrete hardware component, or any combination thereof). In some cases, the processor unit 115 is configured to operate a memory array using a memory controller. In other cases, a memory controller is integrated into the processor unit 115. In some cases, the processor unit 115 is configured to execute computer-readable instructions stored in a memory to perform various functions. In some embodiments, a processor unit 115 includes special purpose components for modem processing, baseband processing, digital signal processing, or transmission processing.

Examples of a memory unit 120 include random access memory (RAM), read-only memory (ROM), or a hard disk. Examples of memory unit 120 include solid state memory and a hard disk drive. In some examples, memory unit 120 is used to store computer-readable, computer-executable software including instructions that, when executed, cause a processor to perform various functions described herein. In some cases, the memory unit 120 contains, among other things, a basic input/output system (BIOS) which controls basic hardware or software operation such as the interaction with peripheral components or devices. In some cases, a memory controller operates memory cells. For example, the memory controller can include a row decoder, column decoder, or both. In some cases, memory cells within a memory unit 120 store information in the form of a logical state.

A cloud 135 is a computer network configured to provide on-demand availability of computer system resources, such as data storage and computing power. In some examples, the cloud 135 provides resources without active management by the user. The term cloud 135 is sometimes used to describe data centers available to many users over the Internet. Some large cloud networks have functions distributed over multiple locations from central servers. A server is designated an edge server if it has a direct or close connection to a user. In some cases, a cloud 135 is limited to a single organization.

In other examples, the cloud 135 is available to many organizations. In one example, a cloud 135 includes a multi-layer communications network comprising multiple edge routers and core routers. In another example, a cloud 135 is based on a local collection of switches in a single physical location.

A database 140 is an organized collection of data. For example, a database 140 stores data in a specified format known as a schema. A database 140 may be structured as a single database, a distributed database, multiple distributed databases, or an emergency backup database. In some cases, a database controller may manage data storage and processing in a database 140. In some cases, a user 100 interacts with database 140 controller. In other cases, database controller may operate automatically without user interaction. In some examples, the database 140 includes a selection of images that include foreground text.

According to some embodiments, image application 125 receives an image including a foreground text portion and a background portion. Text segmentation apparatus 110 identifies the foreground text portion based on the classification from the neural network 130. In some examples, image application 125 modifies a texture of the foreground text portion to produce a modified image.

According to some embodiments, image application 125 identifies initial training images. In some examples, image application 125 identifies the foreground text portion and the background portion for each of the initial training images. In some examples, image application 125 modifies the initial training images based on the identified foreground text portion to produce additional training images, where the training set includes the initial training images and the additional training images. In some examples, image application 125 replaces the background text portion while retaining the foreground text portion.

In some examples, image application 125 includes a graphics editor (e.g., Microsoft® Paint or Adobe® Photoshop). The user may select a digital image and input the image to the neural network for text segmentation using the image application 125. The user can further edit the output image from the neural network (i.e., processed image having foreground text identified) using the image application 125.

In some embodiments, the text segmentation apparatus 110 includes an artificial neural network (ANN). An ANN is a hardware or a software component that includes a number of connected nodes (i.e., artificial neurons), which loosely correspond to the neurons in a human brain. Each connection, or edge, transmits a signal from one node to another (like the physical synapses in a brain). When a node receives a signal, it processes the signal and then transmits the processed signal to other connected nodes. In some cases, the signals between nodes comprise real numbers, and the output of each node is computed by a function of the sum of its inputs. Each node and edge is associated with one or more node weights that determine how the signal is processed and transmitted.

During the training process, these weights are adjusted to improve the accuracy of the result (i.e., by minimizing a loss function which corresponds in some way to the difference between the current result and the target result). The weight of an edge increases or decreases the strength of the signal transmitted between nodes. In some cases, nodes have a threshold below which a signal is not transmitted at all. In some examples, the nodes are aggregated into layers. Different layers perform different transformations on their inputs. The initial layer is known as the input layer and the last layer is known as the output layer. In some cases, signals traverse certain layers multiple times.

In some embodiments, the text segmentation apparatus 110 includes a convolutional neural network (CNN). For example, an encoder used to identify image features may include convolutional layers. A CNN is a class of neural network that is commonly used in computer vision or image classification systems. In some cases, a CNN may enable processing of digital images with minimal pre-processing. A CNN may be characterized by the use of convolutional (or cross-correlational) hidden layers. These layers apply a convolution operation to the input before signaling the result to the next layer. Each convolutional node may process data for a limited field of input (i.e., the receptive field). During a forward pass of the CNN, filters at each layer may be convolved across the input volume, computing the dot product between the filter and the input. During the training process, the filters may be modified so that they activate when they detect a particular feature within the input.

According to some embodiments, neural network 130 classifies each pixel of the image as foreground text or background that refines a segmentation prediction using a key vector representing features of the foreground text portion, where the key vector is based on the segmentation prediction.

According to some embodiments, neural network 130 classifies each pixel of the training images as foreground text or background to produce a segmentation prediction for each of the training images. In some examples, neural network 130 computes a first loss function based on a comparison of the segmentation prediction and the ground truth segmentation information. Neural network 130 computes a second loss function based on a comparison of the refined segmentation prediction and the ground truth segmentation information. Parameters of the neural network 130 are updated based on the first loss function and the second loss function. In some cases, the neural network is also referred to as a text refinement network.

Embodiments of the present disclosure provide a deep learning neural network. The neural network includes an interchangeable encoder network and a customized query-key attention mechanism that spreads and compares text foreground information across one image. In an embodiment, the neural network includes channel-wise cosine-similarity re-thresholding, foreground feature pooling, and query-key attention. As a result, the neural network increases the accuracy of classification and segmentation prediction results.

According to an embodiment, the neural network includes two components, a backbone network for segmentation prediction and a network extension that utilizes the output from the backbone network and refines its prediction using a customized query-key attention mechanism. The backbone network is an interchangeable encoder network and provides segmentation result on text regions. In some examples, the backbone network includes ResNet101, DeepLabV3+ or another suitable image processing network. However, embodiments of the present disclosure are not limited to the choice of backbone network. The neural network imposes no restrictions on selecting the backbone network and users can pick one according to their underlining tasks and computation environment.

Figure 2:
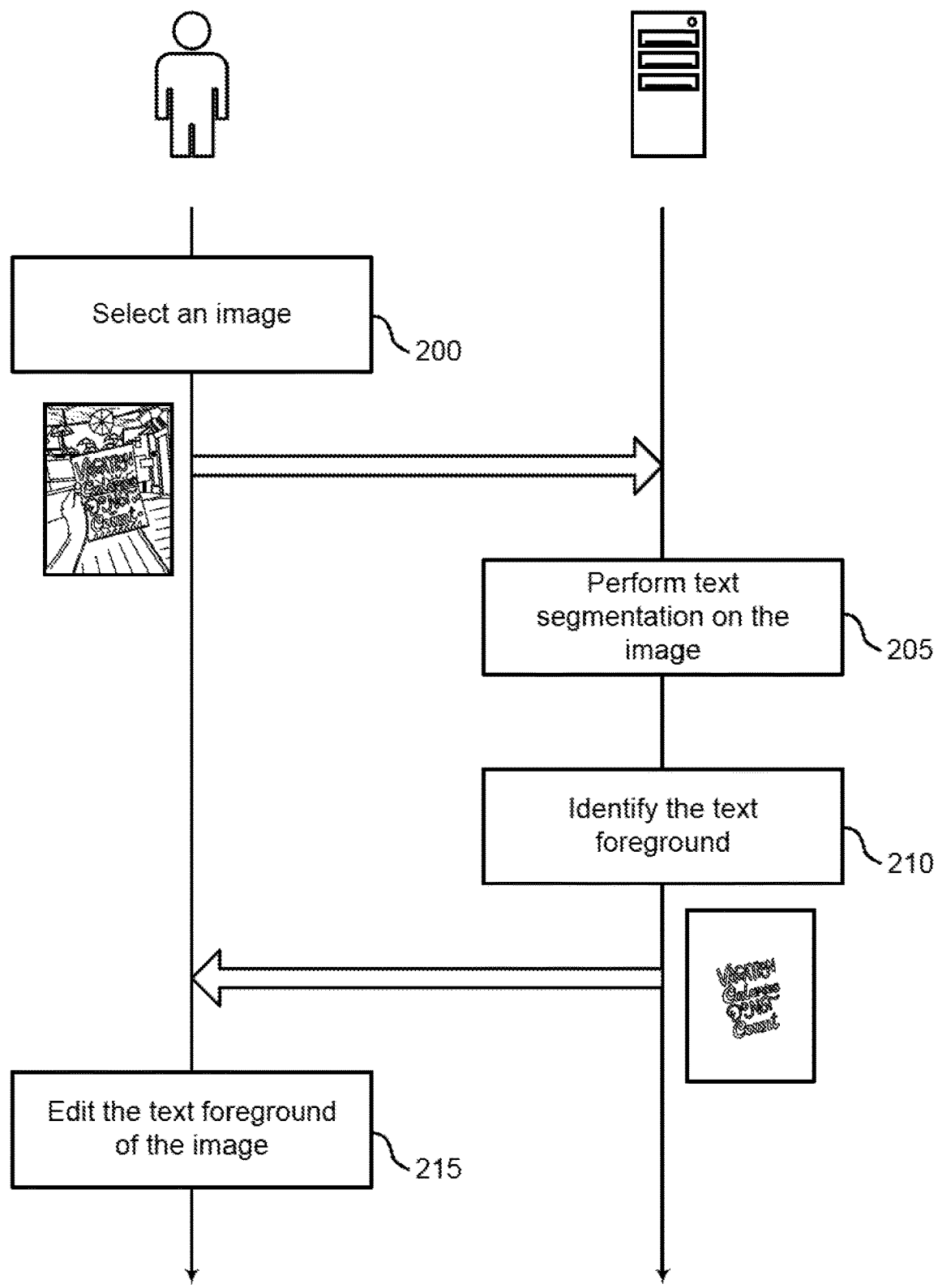
FIG. 2 shows an example of a process for text segmentation according to aspects of the present disclosure.

FIG. 2 shows an example of a process for text segmentation according to aspects of the present disclosure. In some examples, these operations are performed by a system including a processor executing a set of codes to control functional elements of an apparatus. Additionally or alternatively, certain processes are performed using special-purpose hardware. Generally, these operations are performed according to the methods and processes described in accordance with aspects of the present disclosure. In some cases, the operations described herein are composed of various substeps, or are performed in conjunction with other operations.

At operation 200, a user selects an image including a text foreground. The user may upload a digital image to the image application (e.g., Adobe® Photoshop). In some examples, the user selects a digital image from the database or the cloud. The text foreground is embedded in the scene and includes text patterns such as English letters. According to an example, the text foreground includes artistic font or curvy font where the letters of that customized font are shapely, smooth, and flowing. In some cases, the operations of this step refer to, or may be performed by, a user as described with reference to FIG. 1.

At operation 205, the system performs text segmentation on the image. The system includes a neural network which can classify and segment objects related to text foreground at the pixel-level. The neural network is able to segment various types of text patterns such as regular font, artistic font, customized text designs that are embedded in the image selected by the user. In some cases, the operations of this step refer to, or may be performed by, a neural network as described with reference to FIG. 1.

At operation 210, the system identifies the text foreground. The text foreground of the image is segmented, preserved and output by the system. The neural network discards non-textual information or objects that do not fall under text segmentation, for example, surroundings and objects that are not labeled as text. Unlike the input image where text is mixed with surroundings and not obvious, the user can easily view text foreground from the output image of the system. In some cases, the operations of this step refer to, or may be performed by, an image application as described with reference to FIG. 1.

At operation 215, the user edits the text foreground of the image. The user may continue to edit the text foreground of the image using the image application (e.g., Adobe® Photoshop). In some examples, the user changes the content of the text, and/or text patterns (e.g., using a different stylistic font) based on the identified text foreground portion of the image. In some cases, the operations of this step refer to, or may be performed by, a user as described with reference to FIG. 1.

Text Segmentation

Figure 3:
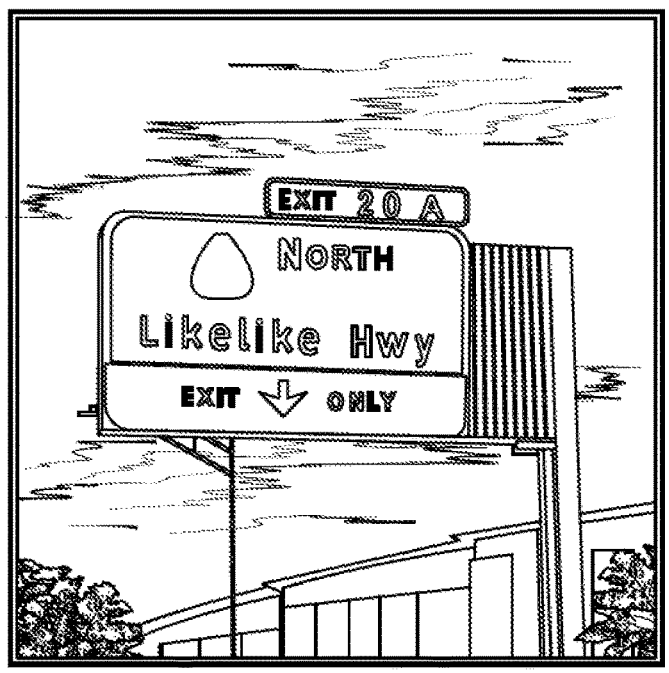
FIGS. 3 and 4 show examples of text segmentation according to aspects of the present disclosure.
Figure 3:
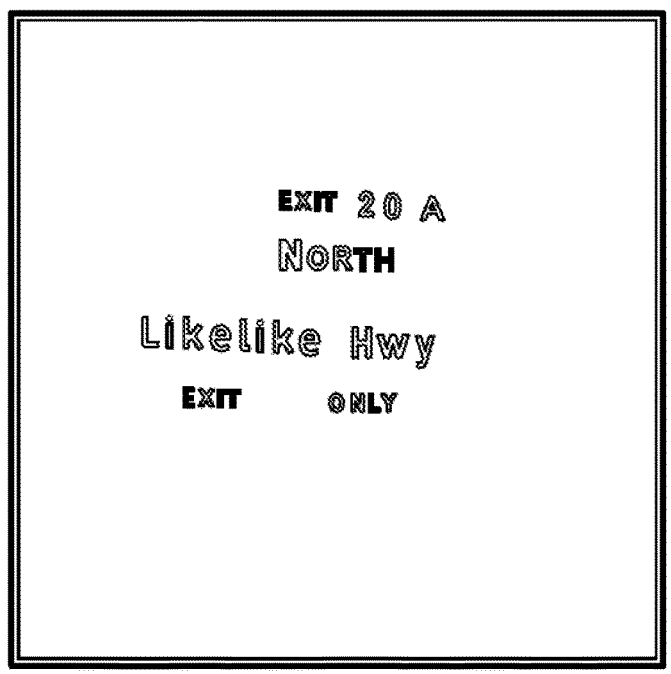

FIG. 3 shows an example of text segmentation according to aspects of the present disclosure. The example shown includes original image 300 and text foreground 305. In some cases, original image 300 includes a set of objects from a scene. Some of the objects include text. According to an example, original image 300 includes a highway exit sign (drivers know it is an exit sign due to the upper-case font text "EXIT ONLY" posted on the exit sign. The exit sign displays an exit number assigned to a road junction (e.g., 20 A) and the destination of the exit if a driver exits at this junction (e.g., Likelike Hwy). Apart from the text, the original image also includes scene about the surroundings, for example, roofs of houses, tree leaves, sky, and the exit sign mounting structure.

Text foreground 305 includes exclusively text information in the image. Text foreground 305 does not include surroundings in the scene that are not labeled as text. In the example above, text foreground 305 includes regular font, artistic font or the combination of both (e.g., "EXIT 20 A", "NORTH", "Likelike Hwy", and "EXIT ONLY" are shown in the text foreground).

According to some embodiments, original image 300 is used for training and therefore input to the neural network. Text foreground 305 is the ground truth annotation. A loss function is computed between the segmentation prediction based on the original image and the ground truth annotation. In some cases, original image 300 is input to the neural network for inference.

Figure 4:
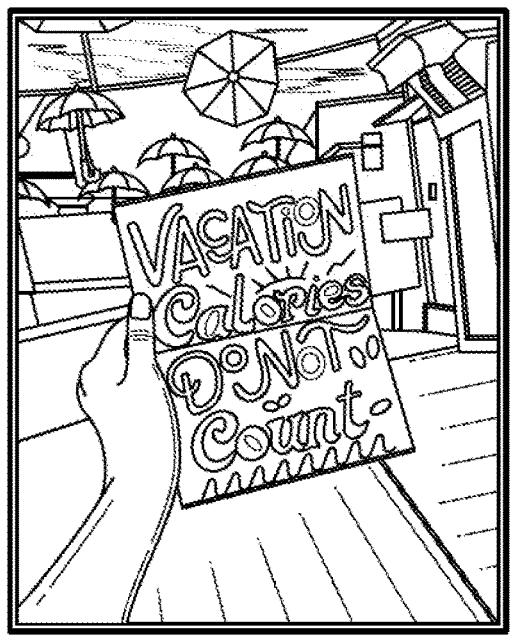
Figure 4:

FIG. 4 shows an example of text segmentation according to aspects of the present disclosure. The example shown includes original image 400 and text foreground 405. Original image 400 includes text or text patterns having a specified font from a user. In some cases, the text patterns include artistic designs from the user. According to an example, original image 400 includes a human hand holding an artistic, non-regular font of text. The text includes "vacation calories do not count". In some cases, text font is not easily recognized as letters by the user since the text is mixed with other non-textual information of the scene and/or the letters have curved shapes making the text less obvious to the user. There are non-textual surroundings in the original image such as streets, umbrellas, and houses. The user is interested in knowing the accurate content of the text (e.g., spelling of each word in the phrase) and may continue to edit the identified text from the original image.

Text foreground 405 includes exclusively text information. Text foreground 405 does not have surrounding information which are not labeled as text in the scene. In the example above, text foreground 405 includes text stating "vacation calories do not count". The text is of an artistic font (e.g., some of the English letters have a curvy or customized font such that the letters are shapely, smooth, and flowing).

According to some embodiments, original image 400 is used for training and therefore input to the neural network. Text foreground 405 is the ground truth annotation. A loss function is computed between the segmentation prediction based on the original image and the ground truth annotation. In some cases, original image 400 is input to the neural network for inference.

Architecture

Figure 5:
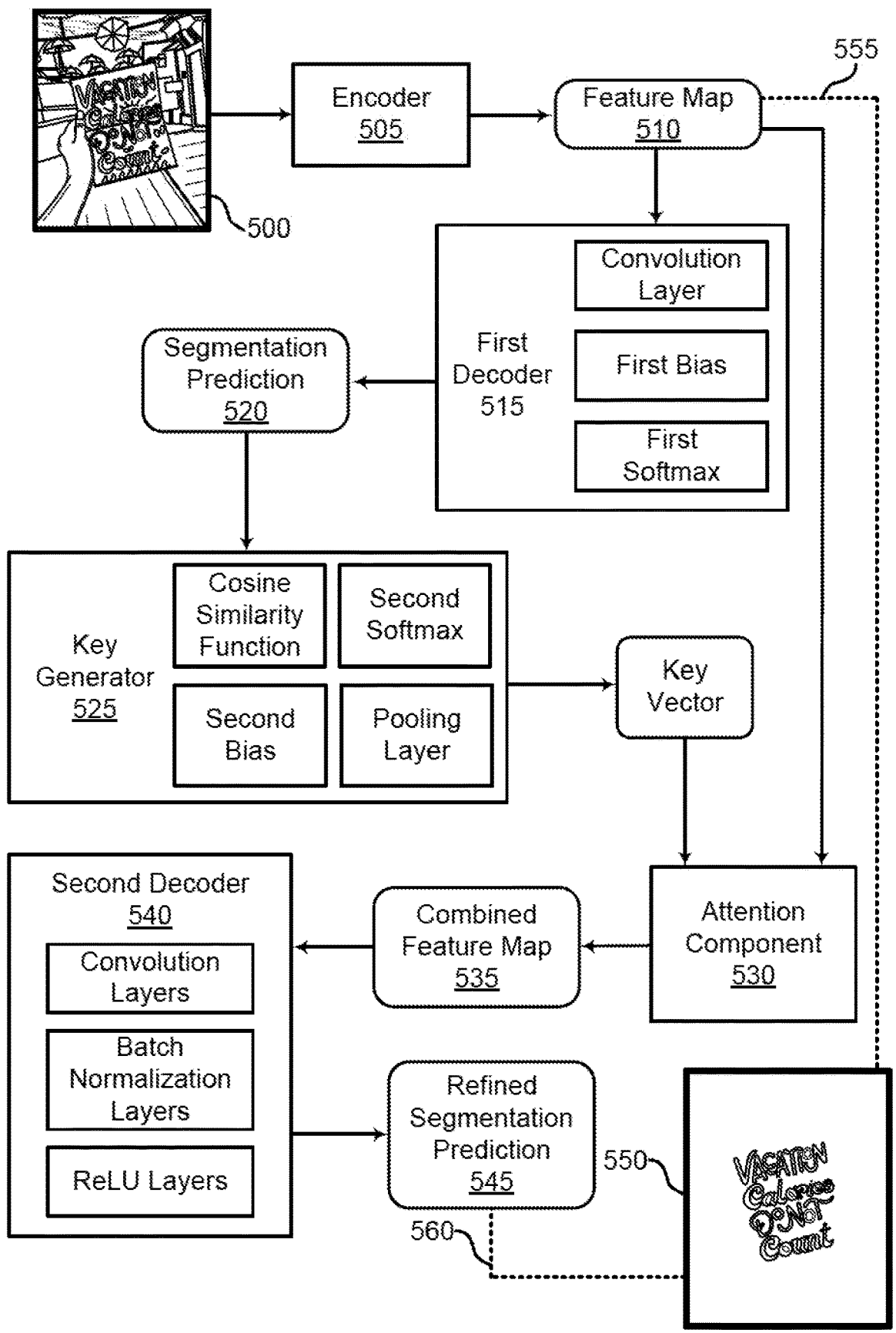
FIG. 5 shows an example of text segmentation apparatus according to aspects of the present disclosure.

FIG. 5 shows an example of text segmentation apparatus according to aspects of the present disclosure. The example shown includes original image 500, encoder 505, feature map 510, first decoder 515, segmentation prediction 520, key generator 525, attention component 530, combined feature map 535, second decoder 540, refined segmentation prediction 545, text foreground 550, first loss 555, and second loss 560.

According to some embodiments, the neural network (i.e., network model) includes a backbone network, and a refinement extension. The backbone network is an interchangeable encoder network that is selected by users based on their tasks and computation environment. The backbone network is also referred to as encoder 505. The refinement extension is a query-key attention mechanism that processes the (output) feature map 510 from the backbone network. According to an embodiment, the neural network includes encoder 505, first decoder 515, key generator 525, attention component 530, and second decoder 540. In some cases, the neural network is also referred to as the text refinement network or the model.

Original image 500 is an input image to encoder 505. In some cases, original image is referred to as the input image x. Original image 500 include text or text patterns in a certain font. In some cases, the text patterns include artistic designs from a user. For example, as illustrated in FIG. 5, original image 500 includes a human hand holding an artistic, non-regular font of text stating "vacation calories do not count". In some cases, font of the text is not easily recognizable by a user. There are non-textual surroundings in the original image such as streets, umbrellas, and houses. A user is interested in knowing the accurate content of the text (e.g., spelling of the text) and may continue to edit the identified text from the original image. Original image 500 is an example of, or includes aspects of, the corresponding element described with reference to FIGS. 3 and 4.

According to some embodiments, encoder 505 encodes the input image x to produce a feature map 510. The feature map 510 is denoted as $x_f$. Encoder 505 encodes an image of the training images to produce a feature map 510. For example, one of the training images is original image 500 (i.e., the input image x). In some embodiments, encoder 505 is configured to encode an image to produce a feature map 510, wherein the image includes a foreground text portion and a background portion. In some examples, the encoder 505 includes a ResNet architecture. In some other examples, the encoder 505 includes a DeepLabV3+ architecture. However, embodiments of the present disclosure are not limited to the choice of the encoder network.

According to some embodiments, first decoder 515 decodes the feature map 510 to produce the segmentation prediction 520. The segmentation prediction 520 is denoted as $x_{sem}$. In some examples, the first decoder 515 includes a convolution layer, a first bias, and a first softmax. First decoder 515 applies a convolutional layer to the feature map 510. First decoder 515 applies a first bias to an output of the convolutional layer. First decoder 515 applies a first softmax to an output of the first bias.

According to an embodiment, the model computes the segmentation prediction $x_{sem}$ via an extra convolution layer with bias and a softmax layer. Then $x_{sem}$ is supervised with the ground truth annotation y using cross-entropy loss $L_{sem}$ (i.e., the first loss 555). Since the model computes $L_{sem}$ directly using $x_{sem}$ and y, it imposes strong supervision on the parameters of encoder 505.

According to some embodiments, key generator 525 identifies the key vector based on the segmentation prediction 520. In some examples, key generator 525 computes a cosine similarity of the segmentation prediction 520. Key generator 525 applies a second bias based on the cosine similarity. Key generator 525 applies a second softmax to an output of the second bias. Key generator 525 combines the second softmax with the feature map 510. Key generator 525 applies a pooling layer to produce the key vector.

According to some embodiments, key generator 525 identifies a key vector representing features of the foreground text portion based on the segmentation prediction 520. In some examples, the key generator 525 includes a cosine similarity function, a second bias, a second softmax, a first product function, and a pooling layer. Key generator 525 computes a cosine similarity of the segmentation prediction 520. Key generator 525 applies a second bias based on the cosine similarity. Key generator 525 applies a second softmax to an output of the second bias. Key generator 525 combines the second softmax with the feature map 510. Key generator 525 applies a pooling layer to produce the key vector.

According to an embodiment, the model re-thresholds $x_{sem}$ and obtains modified segmentation prediction denoted as $\hat{x}_{sem}$ in which only foreground prediction with high-confident remain activated. The model carries out this re-thresholding step by putting a new bias on the convolutional layer that generates $x_{sem}$. This new bias is linearly proportional to the channel-wise cosine-similarity of $x_{sem}$.

$$cossim(x, y) = \frac{x^T \cdot y}{\|x\|\|y\|} \quad (1)$$

According to an embodiment, the channel-wise cosine-similarity of $x_{sem}$ is inversely proportional to its prediction accuracy. Thus, when $x_{sem}$ becomes inaccurate, its channel-wise cosine-similarity goes up and the bias on background channel goes up. This equivalently decreases the activation on the foreground region in $\hat{x}_{sem}$ when passing through the softmax. As a result, only the foreground prediction with high-confidence remain activated in $\hat{x}_{sem}$.

Then, the model pools a feature vector $v_k$ within the high-confidence region of $\hat{x}_{sem}$ to represent the foreground texture of text. Such pooling is performed through a weighted sum between the feature map $x_f$ and the $\hat{x}_{sem}$.

$$v_k = \sum_{n=1...N} x_f^n \cdot \hat{x}_{sem}^n \quad (2)$$

where N denotes the number of pixels of the map, thus it only keeps the channel dimension (C). By doing so, the model not only summarizes text foreground information into $v_k$ within one image but reduces the dependency of $v_k$ with backbone (i.e., encoder) parameters between different images.

According to some embodiments, attention component 530 classifies each pixel of the training images as foreground text or background based on the key vector to produce a refined segmentation prediction 545 for each of the training images. In some examples, attention component 530 combines the key vector and the feature map 510 to produce an attention map. In some examples, attention component 530 combines the attention map and the feature map 510 to produce a combined feature map 535. In some examples, the combined feature map 535 includes color information for each pixel of the image. According to some embodiments, attention component 530 is configured to produce a combined feature map 535 based on key vector. In some examples, the attention component 530 includes a second product function and a concatenation function.

According to an embodiment, the model uses $v_k$ as key, $x_f$ as query and computes the attention $x_{att}$ through dot product. Since the dot product is carried out on all pixel locations, the texture information is spread globally to all parts of image.

According to some embodiments, second decoder 540 decodes the combined feature map 535 to produce a refined segmentation prediction 545, where the foreground text portion is identified based on the refined segmentation prediction 545. According to some embodiments, second decoder 540 is configured to produce a refined segmentation prediction 545 based on the combined feature map 535. In some examples, the second decoder 540 includes convolution layers, batch normalization layers and ReLU layers. The refined segmentation prediction 545 is denoted as $x_{rfn}$.

According to an embodiment, the model concatenates the input image x, the feature map $x_f$ and the newly computed attention $x_{att}$, and passes this new matrix through two additional conv5×5 layers and one conv1×1 layer to obtain the final refined result $x_{rfn}$. $x_{rfn}$ is supervised with the ground truth annotation y using cross-entropy loss $L_{rfn}$ (i.e., the second loss 560) during training time. $x_{rfn}$ serves as the final output of the model during inference time (i.e., when using the model for prediction). The final loss L (i.e., second loss 560) is a weighted sum of $L_{sem}$ and $L_{rfn}$.

$$L_{sem} = \frac{1}{|C| \times |N|} \sum_{c=1...C} \sum_{n=1...N} y^{c,n} \log x_{sem}^{c,n} \quad (3)$$

$$L_{rfn} = \frac{1}{|C| \times |N|} \sum_{c=1...C} \sum_{n=1...N} y^{c,n} \log x_{rfn}^{c,n} \quad (4)$$

$$L = w_{sem} L_{sem} + w_{rfn} L_{rfn} \quad (5)$$

According to an embodiment, the model can be trained end-to-end. During the training process, the hyperparameters are set as the following, for example, the weights on both $L_{sem}$ and $L_{rfn}$ are 1. The training length is set to 20500 total iterations. The learning rate is 0.01 and it is slowly decayed from 0.01 to 0 using the 0.9 poly rules. A 500 iteration warmup is used at the beginning of the training. One embodiment of the present disclosure uses the ImageNet pre-trained model as the initial model. No hyperparameters are needed during the inference time.

In some cases, text foreground 550 is a ground truth image (denoted as y). For example, the text foreground 550 includes text information (or query) stating "vacation calories do not count". The text foreground 550 includes regular font, artistic font, or the combination of both. Unlike the original image, the text foreground 550 does not have non-textual information (e.g., context information, surroundings). Text foreground 550 is an example of, or includes aspects of, the corresponding element described with reference to FIGS. 3 and 4.

Inference

Figure 6:
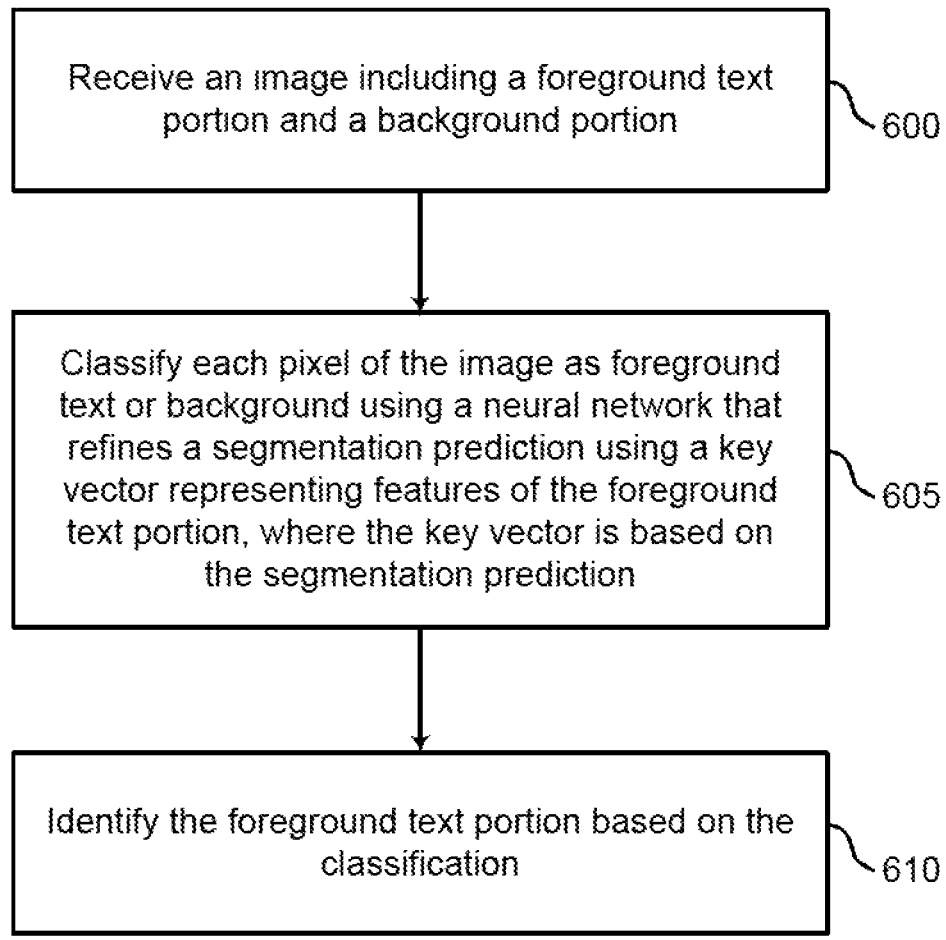
FIG. 6 shows an example of a process for text segmentation according to aspects of the present disclosure.

FIG. 6 shows an example of a process for text segmentation according to aspects of the present disclosure. In some examples, these operations are performed by a system including a processor executing a set of codes to control functional elements of an apparatus. Additionally or alternatively, certain processes are performed using special-purpose hardware. Generally, these operations are performed according to the methods and processes described in accordance with aspects of the present disclosure. In some cases, the operations described herein are composed of various substeps, or are performed in conjunction with other operations.

At operation 600, the system receives an image including a foreground text portion and a background portion. In some cases, the operations of this step refer to, or may be performed by, an image application as described with reference to FIG. 1. The image application includes a graphics editor (e.g., Microsoft® Paint or Adobe® Photoshop).

According to some embodiments, the image received include text patterns in regular font and/or artistic designs that are embedded in the image. In some cases, the image can be used to train the neural network at training stage and therefore input to the neural network. In some cases, the image is used for inference and the neural network produces text segmentation results based on the image.

At operation 605, the system classifies each pixel of the image as foreground text or background using a neural network that refines a segmentation prediction using a key vector representing features of the foreground text portion, where the key vector is based on the segmentation prediction. In some cases, the operations of this step refer to, or may be performed by, a neural network as described with reference to FIG. 1.

According to an embodiment, the neural network includes a backbone network and a network extension that builds upon the output from the backbone network. The backbone network includes a CNN model (e.g., ResNet-101, Deep-LabV3+). DeepLabV3+ is a CNN model used for semantic segmentation including an encoder-decoder network. ResNet-101 is a CNN model that is 101 layers deep. In some examples, the ResNet-101 network is pre-trained on the ImageNet database. However, embodiments of the present disclosure are not limited to the choice of backbone network. The neural network imposes no restrictions on selecting the backbone network and users can select the backbone network according to their underlining tasks and computation environment.

In some cases, the backbone network is referred to as an encoder. The network extension refines segmentation prediction from the backbone network using a query key attention mechanism. The neural network can parse text foreground from the image at the pixel-level. Therefore, the accuracy of text segmentation is increased.

According to an embodiment, the neural network includes an encoder (i.e., backbone network), a first decoder, a key generator, an attention component, and a second decoder. The encoder is configured to encode an image to produce a feature map, where the image includes a foreground text portion and a background portion. The first decoder is configured to decode the feature map to produce a segmentation prediction. The key generator is configured to identify a key vector representing features of the foreground text portion based on the segmentation prediction. The attention component is configured to produce a combined feature map based on the key vector. The second decoder is configured to produce a refined segmentation prediction based on the combined feature map.

At operation 610, the system identifies the foreground text portion based on the classification. A user is able to continue editing the foreground text portion using the graphics editor (e.g., Microsoft® Paint or Adobe® Photoshop). In some cases, the operations of this step refer to, or may be performed by, an image application as described with reference to FIG. 1.

Initial Segmentation

Figure 7:
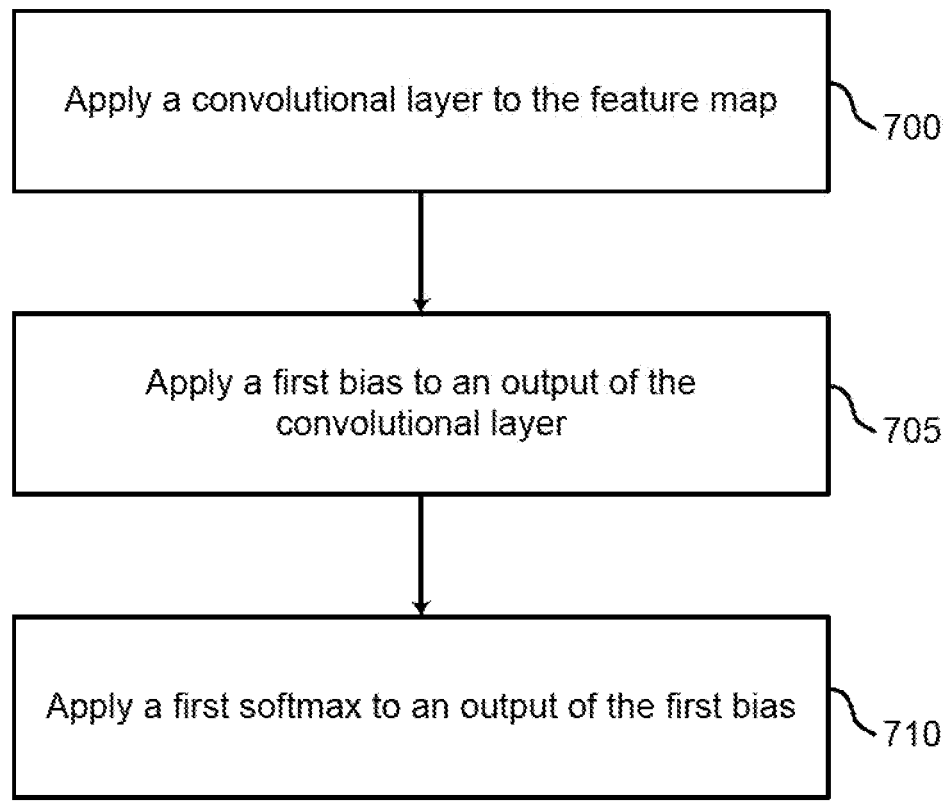
FIG. 7 shows an example of a process for generating a segmentation prediction according to aspects of the present disclosure.

FIG. 7 shows an example of a process for generating a segmentation prediction according to aspects of the present disclosure. In some examples, these operations are performed by a system including a processor executing a set of codes to control functional elements of an apparatus. Additionally or alternatively, certain processes are performed using special-purpose hardware. Generally, these operations are performed according to the methods and processes described in accordance with aspects of the present disclosure. In some cases, the operations described herein are composed of various substeps, or are performed in conjunction with other operations.

At operation 700, the system applies one or more convolutional layers to the feature map. Convolutional layers in a convolutional neural network apply learned filters to input images to generate feature maps. In some cases, the operations of this step refer to, or may be performed by, a first decoder as described with reference to FIG. 5. According to some embodiments, the encoder is configured to encode an image to produce a feature map, wherein the image includes a foreground text portion and a background portion. The first decoder is configured to decode the feature map to produce a segmentation prediction. In some cases, the encoder comprises a ResNet architecture. The first decoder comprises a convolution layer, a first bias, and a first softmax.

At operation 705, the system applies a first bias to an output of the convolutional layer. The first bias value or values is used to shift an activation function of the neural network to the left or right for learning the model. In some examples, changing the weights of the model may change the steepness of the activation function. The entire curve of the activation function may be shifted to the left or right using the first bias. In some cases, the operations of this step refer to, or may be performed by, a first decoder as described with reference to FIG. 5.

At operation 710, the system applies a first softmax to an output of the first bias. The first softmax is also referred to as the first softmax function. According to an embodiment, the first softmax function is used as the activation function of the neural network to normalize the output of the network to a probability distribution over predicted output classes. After applying the first softmax function, each component of the feature map is in the interval (0, 1) and the components add up to one. These values are interpreted as probabilities. In some cases, the operations of this step refer to, or may be performed by, a first decoder as described with reference to FIG. 5.

Text Feature Identification

Figure 8:
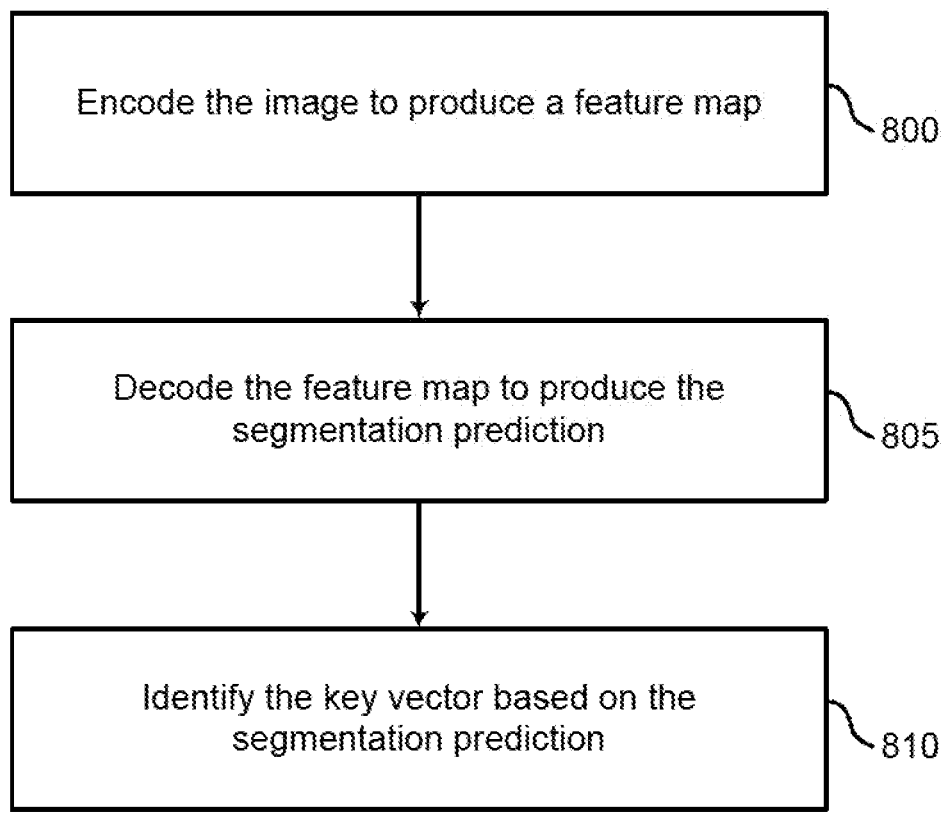
FIG. 8-9 show examples of a process for generating a key vector according to aspects of the present disclosure.

FIG. 8 shows an example of a process for generating a key vector according to aspects of the present disclosure. In some examples, these operations are performed by a system including a processor executing a set of codes to control functional elements of an apparatus. Additionally or alternatively, certain processes are performed using special-purpose hardware. Generally, these operations are performed according to the methods and processes described in accordance with aspects of the present disclosure. In some cases, the operations described herein are composed of various substeps, or are performed in conjunction with other operations.

At operation 800, the system encodes the image to produce a feature map. The neural network includes a backbone network (i.e., also denoted as an encoder). The encoder extracts the feature map from an input image. In some cases, the operations of this step refer to, or may be performed by, an encoder as described with reference to FIG. 5.

At operation 805, the system decodes the feature map to produce the segmentation prediction. The encoder computes the segmentation prediction through the first decoder. The first decoder includes a convolution layer, a first bias, and a first softmax. In some cases, the operations of this step refer to, or may be performed by, a first decoder as described with reference to FIG. 5.

At operation 810, the system identifies the key vector based on the segmentation prediction. The key generator is configured to identify a key vector representing features of the foreground text portion based on the segmentation prediction. According to an embodiment, the key generator includes a cosine similarity function, a second bias, a second softmax, a first product function, and a pooling layer.

According to an embodiment, the neural network sophisticatedly re-thresholds the segmentation prediction and obtains modified segmentation prediction. The neural network carries out this re-thresholding step by putting a new bias on the convolution layer that generates the segmentation prediction. This new bias is linearly proportional to the channel-wise cosine-similarity of segmentation prediction. According to an embodiment, the channel-wise cosine-similarity of the segmentation prediction is inversely proportional to its prediction accuracy. Thus, when the segmentation prediction becomes inaccurate, its channel-wise cosine-similarity goes up and the bias on background channel goes up. This equivalently decreases the activation on the foreground region in the modified segmentation prediction when passing through the softmax. Therefore, only the foreground prediction with high-confidence remain activated in the modified segmentation prediction.

Then, the neural network pools a feature vector within the high-confidence region of the modified segmentation prediction to represent the foreground texture of text. Such pooling is performed through a simple weighted sum between the feature map and the modified segmentation prediction. The neural network not only summarizes text foreground information into the feature vector within one image but reduces the dependency of the feature vector with backbone parameters between different images. In some cases, the feature vector is also denoted as a key vector as described with reference to FIG. 5. In some cases, the operations of this step refer to, or may be performed by, a key generator as described with reference to FIG. 5.

Figure 9:
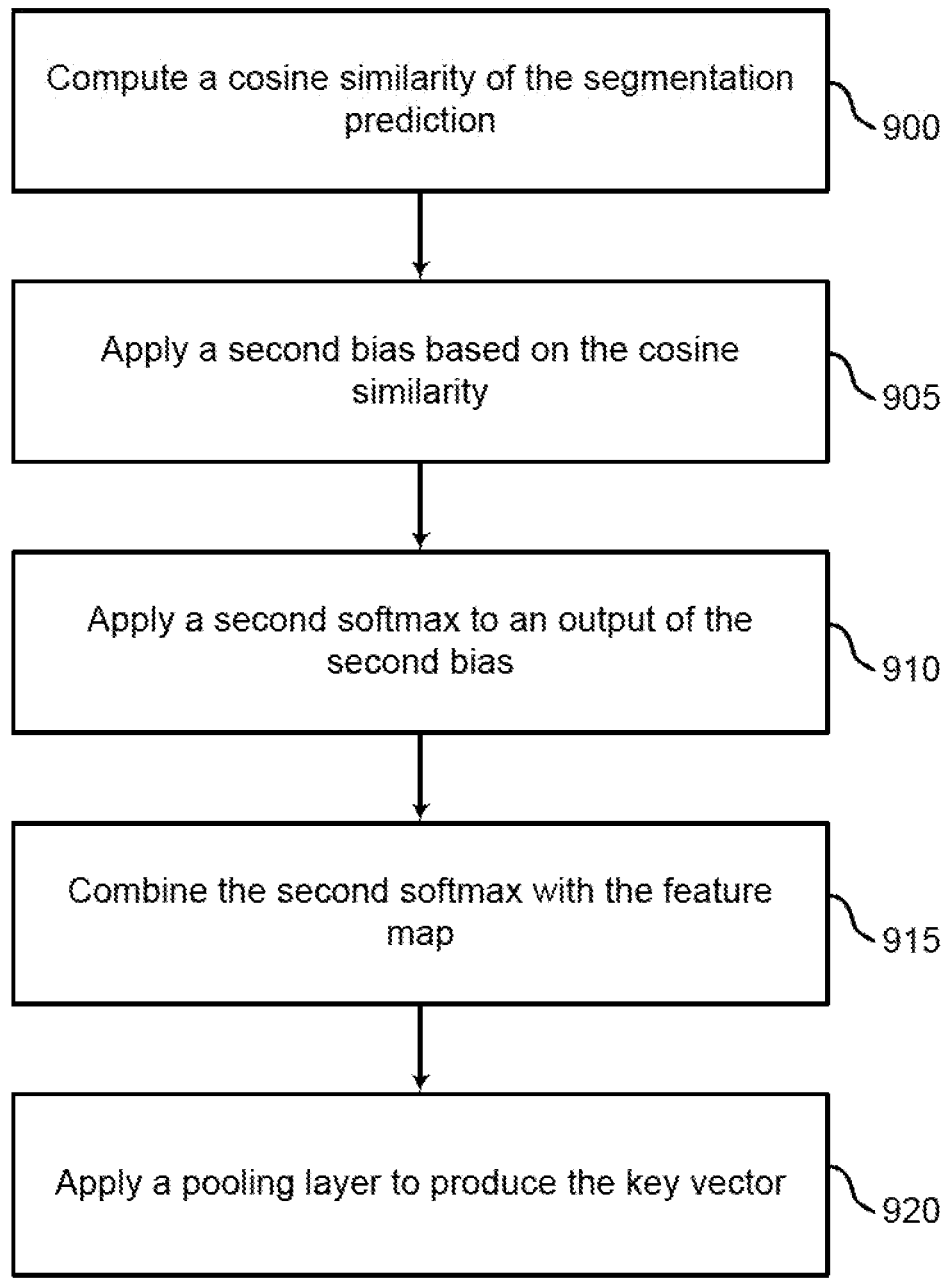

FIG. 9 shows an example of a process for generating a key vector according to aspects of the present disclosure. In some examples, these operations are performed by a system including a processor executing a set of codes to control functional elements of an apparatus. Additionally or alternatively, certain processes are performed using special-purpose hardware. Generally, these operations are performed according to the methods and processes described in accordance with aspects of the present disclosure. In some cases, the operations described herein are composed of various substeps, or are performed in conjunction with other operations.

At operation 900, the system computes a cosine similarity of the segmentation prediction. In some cases, the operations of this step refer to, or may be performed by, a key generator as described with reference to FIG. 5.

According to an embodiment, the neural network sophisticatedly re-thresholds the segmentation prediction and obtains the modified segmentation prediction in which only foreground prediction with high-confident remain activated. The neural network carries out this re-thresholding by putting a new bias on the convolution layer that generates the segmentation prediction. This new bias is linearly proportional to the channel-wise cosine-similarity of the segmentation prediction.

According to an embodiment, the channel-wise cosine-similarity of the segmentation prediction is inversely proportional to its prediction accuracy. Thus, when the segmentation prediction becomes inaccurate, its channel-wise cosine-similarity increases and the bias on background channel increases. This equivalently decreases the activation on the foreground region in the modified segmentation prediction when passing through the softmax function. Therefore, only the foreground prediction with high-confidence remain activated in the modified segmentation prediction.

At operation 905, the system applies a second bias based on the cosine similarity. In some cases, the operations of this step refer to, or may be performed by, a key generator as described with reference to FIG. 5.

At operation 910, the system applies a second softmax to an output of the second bias. In some cases, the operations of this step refer to, or may be performed by, a key generator as described with reference to FIG. 5.

At operation 915, the system combines the second softmax with the feature map. According to an embodiment, the modified segmentation prediction and the feature map are combined and input to a pooling layer. In some cases, the operations of this step refer to, or may be performed by, a key generator as described with reference to FIG. 5.

At operation 920, the system applies a pooling layer to produce the key vector. A pooling layer is a new layer added after the convolutional layer. The pooling layer is used for ordering layers within a convolutional neural network that may be repeated one or more times within a neural network model. The pooling layer operates upon each feature map separately to create a new set of the same number of pooled feature maps. Pooling includes selecting a pooling operation. In some cases, the size of the pooling operation is smaller than the size of the feature map. For example, the size of the pooling operation is 2×2 pixels with a stride of two pixels. Average pooling or maximum pooling operation may be used. In some cases, the operations of this step refer to, or may be performed by, a key generator as described with reference to FIG. 5.

According to an embodiment, the model pools a feature vector $v_k$ (i.e., key vector) within the high-confidence region of modified segmentation prediction to represent the foreground texture of text. Such pooling is performed through a simple weighted sum between the feature map and the modified segmentation prediction. The weighted sum is formulated as $v_k = \Sigma_{n=1 \ldots N} x_f^n \cdot \hat{x}_{sem}^n$, where N denotes the number of pixels of the map, thus it only keeps the channel dimension (C). The neural network not only summarizes text foreground information into $v_k$ within one image but reduces the dependency of $v_k$ with backbone parameters between different images.

Refined Segmentation

Figure 10:
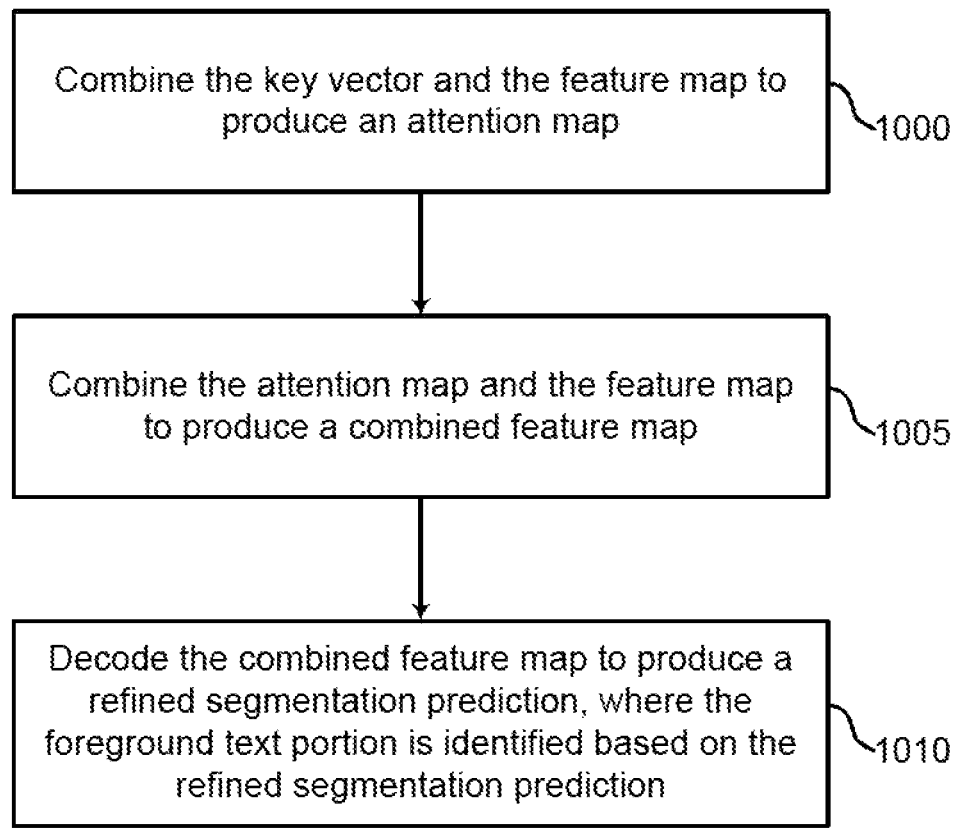
FIG. 10 shows an example of a process for generating a refined segmentation prediction according to aspects of the present disclosure.

FIG. 10 shows an example of a process for generating a refined segmentation prediction according to aspects of the present disclosure. In some examples, these operations are performed by a system including a processor executing a set of codes to control functional elements of an apparatus. Additionally or alternatively, certain processes are performed using special-purpose hardware. Generally, these operations are performed according to the methods and processes described in accordance with aspects of the present disclosure. In some cases, the operations described herein are composed of various substeps, or are performed in conjunction with other operations.

At operation 1000, the system combines the key vector and the feature map to produce an attention map. According to an embodiment, the neural network uses $v_k$ as the key vector, feature map as query and computes the attention map through dot product. In some cases, a dot product is carried out on all pixel locations and that the texture information is applied globally to all parts of the image to emphasize parts of the image having features similar to the text features. In some cases, the operations of this step refer to, or may be performed by, an attention component as described with reference to FIG. 5.

At operation 1005, the system combines the attention map and the feature map to produce a combined feature map. According to an embodiment, an attention component is configured to produce a combined feature map based on the key vector. The attention component includes a second product function and a concatenation function. According to an embodiment, the neural network concatenates the input image (i.e., original image), feature map and the newly computed attention map. The resulting matrix is a combined feature map. In some cases, the operations of this step refer to, or may be performed by, an attention component as described with reference to FIG. 5.

At operation 1010, the system decodes the combined feature map to produce a refined segmentation prediction, where the foreground text portion is identified based on the refined segmentation prediction. According to an embodiment, a second decoder is configured to produce a refined segmentation prediction based on the combined feature map. The second decoder includes convolution layers, batch normalization layers and ReLU layers.

According to an embodiment, the neural network passes the combined feature map through two additional conv5×5 layers and one conv1×1 layer to obtain the final refined result. The final refined result is also referred to as refined segmentation prediction. In some cases, the operations of this step refer to, or may be performed by, a second decoder as described with reference to FIG. 5.

Training

Figure 11:
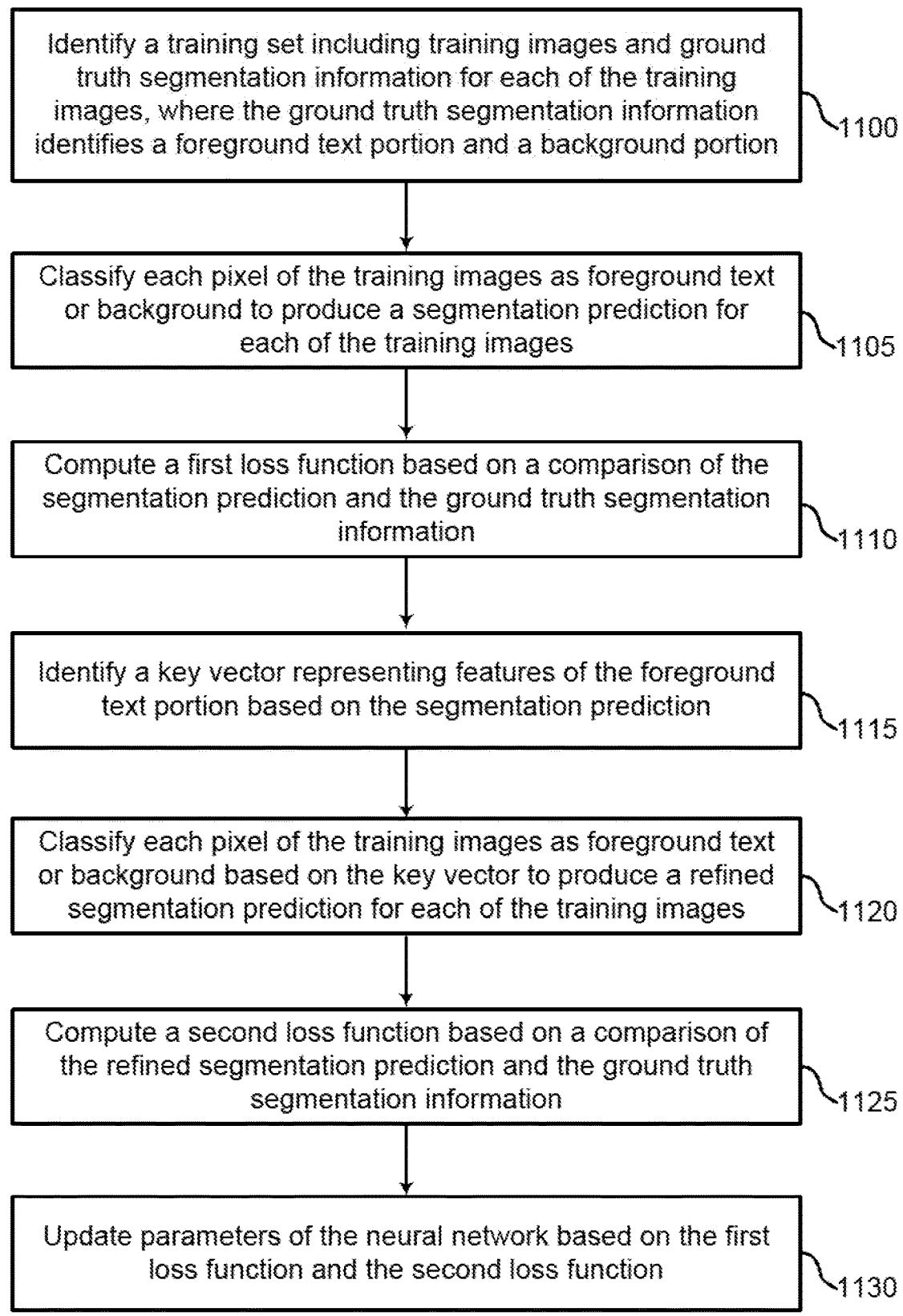
FIG. 11 shows an example of a process for training a neural network for text segmentation according to aspects of the present disclosure.

FIG. 11 shows an example of a process for training a neural network for text segmentation according to aspects of the present disclosure. In some examples, these operations are performed by a system including a processor executing a set of codes to control functional elements of an apparatus. Additionally or alternatively, certain processes are performed using special-purpose hardware. Generally, these operations are performed according to the methods and processes described in accordance with aspects of the present disclosure. In some cases, the operations described herein are composed of various substeps, or are performed in conjunction with other operations.

At operation 1100, the system identifies a training set including training images and ground truth segmentation information for each of the training images, where the ground truth segmentation information identifies a foreground text portion and a background portion. In some cases, the foreground text portion includes exclusively text information. According to an example, the foreground text portion states "vacation calories do not count". The text has a non-regular and artistic font. Some letters of the text have curved shapes. In some cases, the operations of this step refer to, or may be performed by, an image application as described with reference to FIG. 1.

At operation 1105, the system classifies each pixel of the training images as foreground text or background to produce a segmentation prediction for each of the training images. In some cases, the operations of this step refer to, or may be performed by, a neural network as described with reference to FIG. 1.

According to an embodiment, the neural network extracts the feature map from the input image using an encoder, and further computes segmentation prediction via an additional convolution layer with bias and a softmax layer. The output of the softmax layer or softmax function is the segmentation prediction where each component (or element) of the segmentation prediction is in the interval (0, 1). These (0, 1) values corresponding to respective component are interpreted as probabilities, for example, the probability of a pixel of a training image is considered a foreground text or background.

At operation 1110, the system computes a first loss function based on a comparison of the segmentation prediction and the ground truth segmentation information. The segmentation prediction is supervised with the ground truth annotation using cross-entropy loss $L_{sem}$ (i.e., the first loss function). Since the neural network computes the first loss function $L_{sem}$ directly using segmentation prediction and the ground truth segmentation information, it imposes strong supervision on all backbone parameters. In some cases, the operations of this step refer to, or may be performed by, a neural network as described with reference to FIG. 1.

At operation 1115, the system identifies a key vector representing features of the foreground text portion based on the segmentation prediction. According to an embodiment, a key generator is configured to identify a key vector representing features of the foreground text portion based on the segmentation prediction. The key generator includes a cosine similarity function, a second bias, a second softmax, a first product function, and a pooling layer. In some cases, the operations of this step refer to, or may be performed by, a key generator as described with reference to FIG. 5.

At operation 1120, the system classifies each pixel of the training images as foreground text or background based on the key vector to produce a refined segmentation prediction for each of the training images. In some cases, the operations of this step refer to, or may be performed by, an attention component as described with reference to FIG. 5.

According to an embodiment, the neural network uses the key vector, the feature map as query and computes the attention map through dot product of the key vector and the feature map. In some cases, a dot product is carried out on all pixel locations, the texture information is applied globally to all parts of the image to emphasize parts of the image having features similar to the text features. The model concatenates input image, feature map and the newly computed attention map, and passes this new matrix through two additional conv5×5 layers and one additional conv1×1 layer to obtain the refined segmentation prediction.

At operation 1125, the system computes a second loss function based on a comparison of the refined segmentation prediction and the ground truth segmentation information. According to an embodiment, the refined segmentation prediction is supervised using cross-entropy loss $L_{rfn}$ (i.e., the second loss function) during training time and it serves as the final output of the neural network during inference time (i.e., for prediction). The final loss L is a weighted sum of $L_{sem}$ and $L_{rfn}$ (i.e., the first loss function and the second loss function). In some cases, the operations of this step refer to, or may be performed by, a neural network as described with reference to FIG. 1.

At operation 1130, the system updates parameters of the neural network based on the first loss function and the second loss function. In some cases, the operations of this step refer to, or may be performed by, a neural network as described with reference to FIG. 1.

According to an embodiment, the neural network can be trained end-to-end. During the training stage, the hyperparameters are set as the following, for example, the weights on both $L_{sem}$ and $L_{rfn}$ are one. The training length is set to 20500 total iterations. The learning rate is 0.01 and it is slowly decayed from 0.01 to 0 using the 0.9 poly rules. A 500 iteration warmup is used at the beginning of the training. In some cases, the neural network uses ImageNet pre-trained model as an initial model for text segmentation. The encoder of the neural network is a pre-trained backbone network (i.e., weights or parameters of ImageNet are pre-trained for segmentation classification). According to an embodiment, the encoder of the neural network is already trained to identify textures, edges, etc. During the end-to-end training of the neural network, the weights of the encoder are updated (i.e., weights of the ImageNet backbone network are not fixed). No hyperparameters are needed during the inference time.

Figure 12:
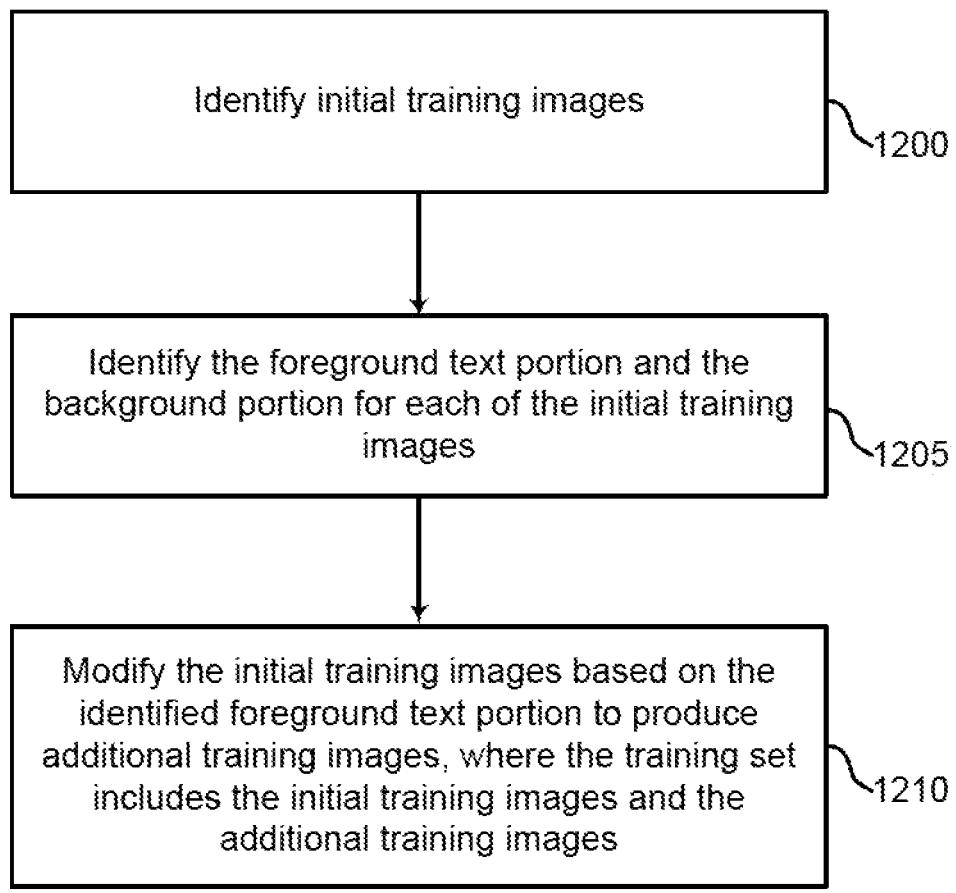
FIG. 12 shows an example of a process for augmenting a training set according to aspects of the present disclosure.

FIG. 12 shows an example of a process for augmenting a training set according to aspects of the present disclosure. In some examples, these operations are performed by a system including a processor executing a set of codes to control functional elements of an apparatus. Additionally or alternatively, certain processes are performed using special-purpose hardware. Generally, these operations are performed according to the methods and processes described in accordance with aspects of the present disclosure. In some cases, the operations described herein are composed of various substeps, or are performed in conjunction with other operations.

At operation 1200, the system identifies initial training images. In some cases, each image of the initial training images has one or more objects in the scene (e.g., a daily scene such as a highway exit post). For example, each image includes textures, edges, text patterns of various types. The text patterns may have regular font, artistic font, customized text designs, or the combination thereof. In some cases, the operations of this step refer to, or may be performed by, an image application as described with reference to FIG. 1.

At operation 1205, the system identifies the foreground text portion and the background portion for each of the initial training images. An image having only the foreground text portion is referred to as a ground truth image or a ground truth annotation. In some cases, the segmentation prediction from the neural network is supervised with the ground truth image using a cross-entropy loss function. In some cases, the operations of this step refer to, or may be performed by, an image application as described with reference to FIG. 1.

At operation 1210, the system modifies the initial training images based on the identified foreground text portion to produce additional training images, where the training set includes the initial training images and the additional training images. In some examples, the additional training images do not have the same text patterns as those of the initial training images. For example, the additional training images have different textures and background colors. Random background swap is another way to modify the initial training images. In some cases, multi-scale training is applied to create a large size training set. In some cases, the operations of this step refer to, or may be performed by, an image application as described with reference to FIG. 1.

Evaluation

The results of the neural network (i.e., the text refinement network) is compared with baseline model DeepLabV3+. The segmentation results from the neural network have substantial qualitative increase in prediction accuracy when comparing with the results from DeepLabV3+. The evaluation metric includes foreground intersection over union (fgIoU), to evaluate the segmentation models. The increase in quantitative result using the neural network is recorded. An ablation study in which the effectiveness of different parts of the neural network is demonstrated. More experiment results using two other public text segmentation dataset (COCOTS and ICDAR17) are recorded. For example, baseline model has an fgIoU score of 85.25% on a customized text segmentation dataset text segmentation dataset. The neural network of the present disclosure increases the fgIoU score to 88.58%. In an example, baseline model has an fgIoU score of 71.13% on the COCOTS dataset. The neural network of the present disclosure increases the fgIoU score to 73.89%. In another example, baseline model has an fgIoU score of 80.77% on the ICDAR17 dataset. The neural network of the present disclosure increases the fgIoU score to 85.09%.

Example Embodiments

Accordingly, the present disclosure includes at least the following embodiments.

A method for text segmentation is described. Embodiments of the method are configured to receive an image including a foreground text portion and a background portion, classify each pixel of the image as foreground text or background using a neural network that refines a segmentation prediction using a key vector representing features of the foreground text portion, wherein the key vector is based on the segmentation prediction, and identify the foreground text portion based on the classification.

An apparatus for text segmentation is described. The apparatus includes a processor, memory in electronic communication with the processor, and instructions stored in the memory. The instructions are operable to cause the processor to receive an image including a foreground text portion and a background portion, classify each pixel of the image as foreground text or background using a neural network that refines a segmentation prediction using a key vector representing features of the foreground text portion, wherein the key vector is based on the segmentation prediction, and identify the foreground text portion based on the classification.

A non-transitory computer readable medium storing code for text segmentation is described. In some examples, the code comprises instructions executable by a processor to: receive an image including a foreground text portion and a background portion, classify each pixel of the image as foreground text or background using a neural network that refines a segmentation prediction using a key vector representing features of the foreground text portion, wherein the key vector is based on the segmentation prediction, and identify the foreground text portion based on the classification.

Some examples of the method, apparatus, and non-transitory computer readable medium described above further include encoding the image to produce a feature map. Some examples further include decoding the feature map to produce the segmentation prediction. Some examples further include identifying the key vector based on the segmentation prediction.

Some examples of the method, apparatus, and non-transitory computer readable medium for decoding the feature map described above further include applying a convolutional layer to the feature map. Some examples further include applying a first bias to an output of the convolutional layer. Some examples further include applying a first softmax to an output of the first bias.

Some examples of the method, apparatus, and non-transitory computer readable medium for identifying the key vector described above further include computing a cosine similarity of the segmentation prediction. Some examples further include applying a second bias based on the cosine similarity. Some examples further include applying a second softmax to an output of the second bias. Some examples further include combining the second softmax with the feature map. Some examples further include applying a pooling layer to produce the key vector.

Some examples of the method, apparatus, and non-transitory computer readable medium described above further include combining the key vector and the feature map to produce an attention map. Some examples further include combining the attention map and the feature map to produce a combined feature map. Some examples further include decoding the combined feature map to produce a refined segmentation prediction, wherein the foreground text portion is identified based on the refined segmentation prediction.

Some examples of the method, apparatus, and non-transitory computer readable medium described above further include modifying a texture of the foreground text portion to produce a modified image.

A method of training a neural network for text segmentation is described. Embodiments of the method are configured to identify a training set comprising training images and ground truth segmentation information for each of the training images, wherein the ground truth segmentation information identifies a foreground text portion and a background portion, classify each pixel of the training images as foreground text or background to produce a segmentation prediction for each of the training images, compute a first loss function based on a comparison of the segmentation prediction and the ground truth segmentation information, identify a key vector representing features of the foreground text portion based on the segmentation prediction, classify each pixel of the training images as foreground text or background based on the key vector to produce a refined segmentation prediction for each of the training images, compute a second loss function based on a comparison of the refined segmentation prediction and the ground truth segmentation information, and update parameters of the neural network based on the first loss function and the second loss function.

An apparatus of training a neural network for text segmentation is described. The apparatus includes a processor, memory in electronic communication with the processor, and instructions stored in the memory. The instructions are operable to cause the processor to identify a training set comprising training images and ground truth segmentation information for each of the training images, wherein the ground truth segmentation information identifies a foreground text portion and a background portion, classify each pixel of the training images as foreground text or background to produce a segmentation prediction for each of the training images, compute a first loss function based on a comparison of the segmentation prediction and the ground truth segmentation information, identify a key vector representing features of the foreground text portion based on the segmentation prediction, classify each pixel of the training images as foreground text or background based on the key vector to produce a refined segmentation prediction for each of the training images, compute a second loss function based on a comparison of the refined segmentation prediction and the ground truth segmentation information, and update parameters of the neural network based on the first loss function and the second loss function.

A non-transitory computer readable medium storing code for training a neural network for text segmentation is described. In some examples, the code comprises instructions executable by a processor to: identify a training set comprising training images and ground truth segmentation information for each of the training images, wherein the ground truth segmentation information identifies a foreground text portion and a background portion, classify each pixel of the training images as foreground text or background to produce a segmentation prediction for each of the training images, compute a first loss function based on a comparison of the segmentation prediction and the ground truth segmentation information, identify a key vector representing features of the foreground text portion based on the segmentation prediction, classify each pixel of the training images as foreground text or background based on the key vector to produce a refined segmentation prediction for each of the training images, compute a second loss function based on a comparison of the refined segmentation prediction and the ground truth segmentation information, and update parameters of the neural network based on the first loss function and the second loss function.

Some examples of the method, apparatus, and non-transitory computer readable medium described above further include encoding an image of the training images to produce a feature map. Some examples further include decoding the feature map to produce the segmentation prediction.

Some examples of the method, apparatus, and non-transitory computer readable medium for decoding the feature map described above further include applying a convolutional layer to the feature map. Some examples further include applying a first bias to an output of the convolutional layer. Some examples further include applying a first softmax to an output of the first bias.

Some examples of the method, apparatus, and non-transitory computer readable medium for identifying the key vector described above further include computing a cosine similarity of the segmentation prediction. Some examples further include applying a second bias based on the cosine similarity. Some examples further include applying a second softmax to an output of the second bias. Some examples further include combining the second softmax with the feature map. Some examples further include applying a pooling layer to produce the key vector.

Some examples of the method, apparatus, and non-transitory computer readable medium described above further include combining the key vector and the feature map to produce an attention map. Some examples further include combining the attention map and the feature map to produce a combined feature map. Some examples further include decoding the combined feature map to produce the refined segmentation prediction, wherein the foreground text portion is identified based on the refined segmentation prediction.

In some examples, the combined feature map comprises color information for each pixel of the image.

Some examples of the method, apparatus, and non-transitory computer readable medium described above further include identifying initial training images. Some examples further include identifying the foreground text portion and the background portion for each of the initial training images. Some examples further include modifying the initial training images based on the identified foreground text portion to produce additional training images, wherein the training set includes the initial training images and the additional training images.

Some examples of the method, apparatus, and non-transitory computer readable medium for modifying the initial training images described above further include replacing the background text portion while retaining the foreground text portion.

An apparatus for text segmentation is described. Embodiments of the apparatus include an encoder configured to encode an image to produce a feature map, wherein the image includes a foreground text portion and a background portion, a first decoder configured to decode the feature map to produce a segmentation prediction, a key generator configured to identify a key vector representing features of the foreground text portion based on the segmentation prediction, an attention component configured to produce a combined feature map based on key vector, and a second decoder configured to produce a refined segmentation prediction based on the combined feature map.

A method of providing an apparatus for text segmentation is described. The method includes providing an encoder configured to encode an image to produce a feature map, wherein the image includes a foreground text portion and a background portion, a first decoder configured to decode the feature map to produce a segmentation prediction, a key generator configured to identify a key vector representing features of the foreground text portion based on the segmentation prediction, an attention component configured to produce a combined feature map based on key vector, and a second decoder configured to produce a refined segmentation prediction based on the combined feature map.

In some examples, the encoder comprises a ResNet architecture. In some examples, the first decoder comprises a convolution layer, a first bias, and a first softmax. In some examples, the key generator comprises a cosine similarity function, a second bias, a second softmax, a first product function, and a pooling layer. In some examples, the attention component comprises a second product function and a concatenation function. In some examples, the second decoder comprises convolution layers, batch normalization layers and ReLU layers.

The description and drawings described herein represent example configurations and do not represent all the implementations within the scope of the claims. For example, the operations and steps may be rearranged, combined or otherwise modified. Also, structures and devices may be represented in the form of block diagrams to represent the relationship between components and avoid obscuring the described concepts. Similar components or features may have the same name but may have different reference numbers corresponding to different figures.

Some modifications to the disclosure may be readily apparent to those skilled in the art, and the principles defined herein may be applied to other variations without departing from the scope of the disclosure. Thus, the disclosure is not limited to the examples and designs described herein, but is to be accorded the broadest scope consistent with the principles and novel features disclosed herein.

The described methods may be implemented or performed by devices that include a general-purpose processor, a digital signal processor (DSP), an application specific integrated circuit (ASIC), a field programmable gate array (FPGA) or other programmable logic device, discrete gate or transistor logic, discrete hardware components, or any combination thereof. A general-purpose processor may be a microprocessor, a conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration). Thus, the functions described herein may be implemented in hardware or software and may be executed by a processor, firmware, or any combination thereof. If implemented in software executed by a processor, the functions may be stored in the form of instructions or code on a computer-readable medium.

Computer-readable media includes both non-transitory computer storage media and communication media including any medium that facilitates transfer of code or data. A non-transitory storage medium may be any available medium that can be accessed by a computer. For example, non-transitory computer-readable media can comprise random access memory (RAM), read-only memory (ROM), electrically erasable programmable read-only memory (EEPROM), compact disk (CD) or other optical disk storage, magnetic disk storage, or any other non-transitory medium for carrying or storing data or code.

Also, connecting components may be properly termed computer-readable media. For example, if code or data is transmitted from a website, server, or other remote source using a coaxial cable, fiber optic cable, twisted pair, digital subscriber line (DSL), or wireless technology such as infrared, radio, or microwave signals, then the coaxial cable, fiber optic cable, twisted pair, DSL, or wireless technology are included in the definition of medium. Combinations of media are also included within the scope of computer-readable media.

In this disclosure and the following claims, the word "or" indicates an inclusive list such that, for example, the list of X, Y, or Z means X or Y or Z or XY or XZ or YZ or XYZ. Also the phrase "based on" is not used to represent a closed set of conditions. For example, a step that is described as "based on condition A" may be based on both condition A and condition B. In other words, the phrase "based on" shall be construed to mean "based at least in part on." Also, the words "a" or "an" indicate "at least one."

What is claimed is:

1. A method for text segmentation, comprising:
   receiving an image including a foreground text portion and a background portion;
   encoding the image to produce a feature map;
   generating a segmentation map of the image based on the feature map, wherein the segmentation map partially identifies the foreground text portion and the background portion;
   generating a key vector representing features of the foreground text portion based on the segmentation map and the feature map;
   combining the key vector and the feature map to produce an attention map; and
   generating, using a neural network, a refined segmentation map by classifying each pixel of the image as foreground text or background based on the attention map and the feature map.

2. The method of claim 1, further comprising:
   decoding the feature map to produce a segmentation prediction; and
   identifying the key vector based on the segmentation prediction.

3. The method of claim 2, wherein decoding the feature map comprises:
   applying a convolutional layer to the feature map;
   applying a first bias to an output of the convolutional layer; and
   applying a first softmax to an output of the first bias.

4. The method of claim 2, wherein identifying the key vector comprises:
   computing a cosine similarity of the segmentation prediction;
   applying a second bias based on the cosine similarity;
   applying a second softmax to an output of the second bias;
   combining the second softmax with the feature map; and
   applying a pooling layer to produce the key vector.

5. The method of claim 1, further comprising:
   combining the attention map and the feature map to produce a combined feature map; and
   decoding the combined feature map to produce a refined segmentation prediction, wherein the foreground text portion is identified based on the refined segmentation prediction.

6. The method of claim 1, further comprising:
   modifying a texture of the foreground text portion to produce a modified image.

7. A method for text segmentation, comprising:
   receiving an image including a foreground text portion and a background portion;
   encoding the image to produce a feature map;
   decoding the feature map to produce a segmentation prediction;
   identifying a key vector based on the segmentation prediction, wherein the key vector represents features of the foreground text portion;
   combining the key vector and the feature map to produce an attention map;
   combining the attention map and the feature map to produce a combined feature map;
   decoding the combined feature map to produce a refined segmentation prediction; and
   identifying the foreground text portion based on the refined segmentation prediction.

8. The method of claim 7, further comprising:
   classifying each pixel of the image as foreground text or background using a neural network that refines the segmentation prediction using the key vector.

9. The method of claim 7, wherein decoding the feature map comprises:
   applying a convolutional layer to the feature map;
   applying a first bias to an output of the convolutional layer; and
   applying a first softmax to an output of the first bias.

10. The method of claim 7, wherein identifying the key vector comprises:
    computing a cosine similarity of the segmentation prediction;
    applying a second bias based on the cosine similarity;
    applying a second softmax to an output of the second bias;
    combining the second softmax with the feature map; and
    applying a pooling layer to produce the key vector.

11. The method of claim 7, further comprising:
    re-thresholding the segmentation prediction to obtain a modified segmentation prediction, wherein the key vector is identified based on the modified segmentation prediction.

12. The method of claim 11, further comprising:
    computing a weighted sum based on the feature map and the modified segmentation prediction, wherein the key vector is identified based on the weighted sum.

13. The method of claim 11, wherein:
    the modified segmentation prediction comprises a foreground prediction of the foreground text portion.

14. An apparatus for text segmentation, comprising:
    one or more processors; and
    one or more memories including instructions executable by the one or more processors to:
      receive an image including a foreground text portion and a background portion;
      encode the image to produce a feature map;
      generate a segmentation map of the image based on the feature map, wherein the segmentation map partially identifies the foreground text portion and the background portion;
      generate a key vector representing features of the foreground text portion based on the segmentation map and the feature map;
      combine the key vector and the feature map to produce an attention map; and
      generate a refined segmentation map by classifying each pixel of the image as foreground text or background based on the attention map and the feature map.

15. The apparatus of claim 14, the instructions being further executable to:
- decode the feature map to produce a segmentation prediction; and
- identify the key vector based on the segmentation prediction.

16. The apparatus of claim 15, wherein decoding the feature map comprises:
- applying a convolutional layer to the feature map;
- applying a first bias to an output of the convolutional layer; and
- applying a first softmax to an output of the first bias.

17. The apparatus of claim 15, wherein identifying the key vector comprises:
- computing a cosine similarity of the segmentation prediction;
- applying a second bias based on the cosine similarity;
- applying a second softmax to an output of the second bias;
- combining the second softmax with the feature map; and
- applying a pooling layer to produce the key vector.

18. The apparatus of claim 14, the instructions being further executable to:
- combine the attention map and the feature map to produce a combined feature map; and
- decode the combined feature map to produce a refined segmentation prediction, wherein the foreground text portion is identified based on the refined segmentation prediction.

19. The apparatus of claim 14, the instructions being further executable to:
- modify a texture of the foreground text portion to produce a modified image.

\* \* \* \* \*